Oct. 16, 1923.　　　　　　　　　　　1,471,291
M. SCHLING
SEED SOWER
Filed Nov. 4, 1922
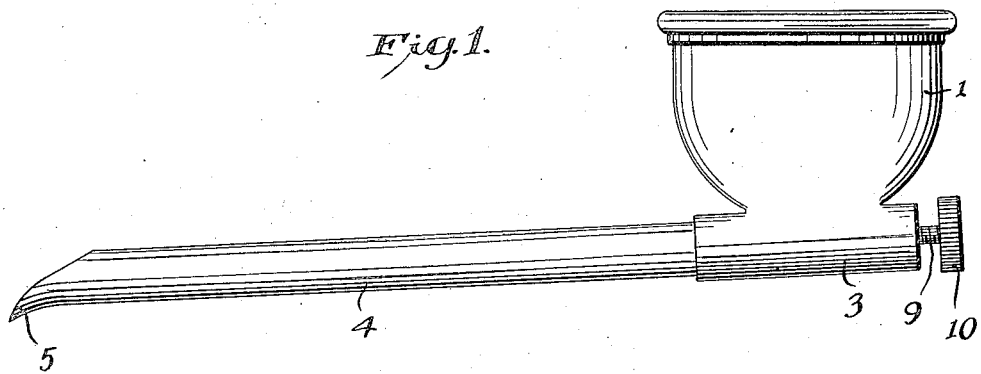
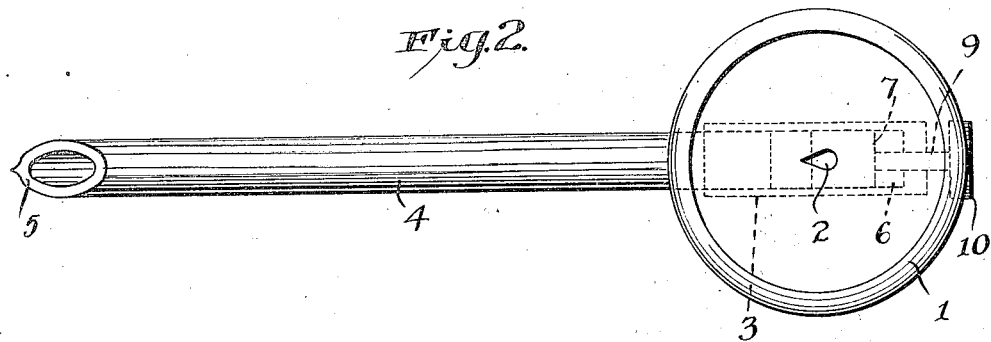
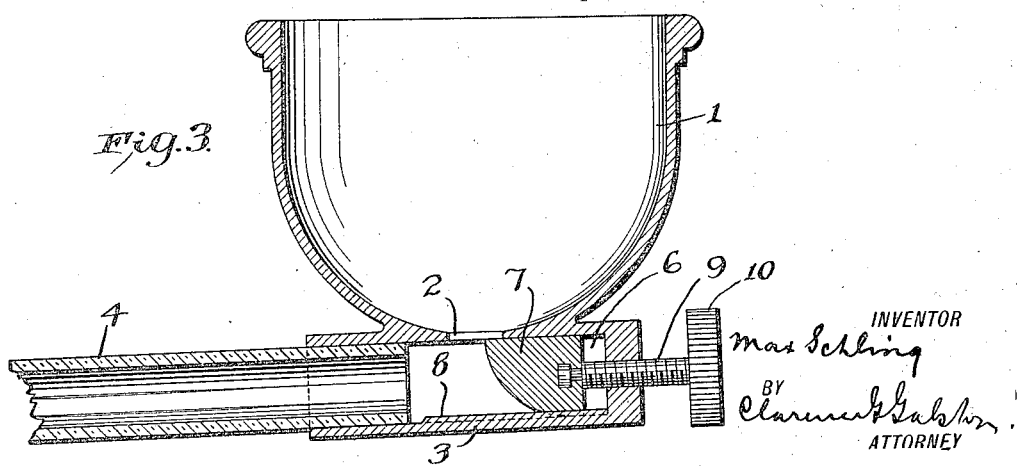
INVENTOR
Max Schling
BY
Clarence... 
ATTORNEY Patented Oct. 16, 1923.

1,471,291

UNITED STATES PATENT OFFICE.

MAX SCHLING, OF NEW YORK, N. Y.

SEED SOWER.

Application filed November 4, 1922. Serial No. 599,170.

*To all whom it may concern:*

Be it known that I, MAX SCHLING, a citizen of the United States, residing at New York city, in the county of New York and State of New York, have invented a new and useful Improvement in Seed Sowers, of which the following is a specification.

The invention is an improvement upon and within the seed-sower disclosed in Patent 1,456,653, dated May 29, 1923, the said seed-sower being an integral, substantially pipe-shaped device adapted to be held in the hand, having a bowl provided with a seed-opening in the bottom, a laterally extending sowing-tube below the opening terminating in an orifice and a slide or valve cooperating with the seed opening between the bowl and the rear end of the tube.

In the particular construction illustrated in the prior application, the slide took the form of a flexible strip guided in a groove in the side and bottom of the bowl chamber. I now provide a slide block located in a chamber beneath the seed-opening and in line with the sowing tube, together with an operating screw projecting rearward from this chamber, in this way obtaining more convenient and effective regulation.

In the accompanying drawings forming part hereof:

Fig. 1 is a side elevation of the improved seed-sower;

Fig. 2 is a plan view; and

Fig. 3 is an enlarged vertical longitudinal section, the sowing tube being broken off.

The seed bowl is marked 1, and the opening in its bottom 2. This opening tapers narrowly or to a point in front, and is wide and preferably rounded at the rear, and may be described as pear-shaped.

Formed on the under part of the bowl is a hollow barrel 3, disposed lengthwise with respect to the seed-opening, its forward portion affording a socket for the reception of the sowing tube 4, which is preferably of glass. This tube projects laterally from the bottom of the bowl, and forwardly of the point of the seed-opening, and the seeds pass from the bowl through the opening to the tube, and from the lip 5 at the forward end of the latter are distributed in the desired manner.

The rear part of the barrel 3 contains a chamber 6 which is beneath the seed-opening and extends a suitable distance rearwardly thereof, and in this chamber is a block 7 slidable longitudinally of the seed-opening. The block is adapted to occupy a position in the back part of the chamber where the opening is full open, and from this position can be advanced so that its top will obstruct the bottom of the seed opening to any desired degree, the effective opening becoming both shorter and narrower as the block approaches the apex of the opening. The front end of the block may be undercut as shown, and a longitudinal rib 8 is represented in the bottom of the chamber to keep the block from turning. The block is advanced and retracted by a screw 9, which passes through a screw-thread hole in the back wall of the barrel and is swiveled at its front end in the block, a knurled disk 10 on the projecting rear end of the screw providing for convenient manipulation.

In sowing with the device it is held in one hand, and by tapping with the other hand a stream of fine seed can be caused to pass from the bowl to the tube, in quantity depending upon the adjustment of the slide, and thence along the tube to the sowing orifice at its far end, from which the issuing seed are directed so as to be deposited with precision at the will of the sower.

What is claimed as new is:

1. A seed-sower comprising an integral, substantially pipe-shaped device adapted to be held in the hand, having a bowl with a seed-opening in the bottom, and a laterally projecting sowing tube terminating in a sowing orifice, and formed with a chamber beneath the seed-opening and at the rear end of the sowing-tube, in combination with a longitudinally movable regulating slide in said chamber coacting with the opening between the bowl and the tube.

2. A seed-sower comprising an integral, substantially pipe-shaped device adapted to be held in the hand, having a bowl with a seed-opening in the bottom, and a laterally projecting sowing tube terminating in a sowing orifice, and formed with a chamber beneath the seed-opening and at the rear end of the sowing-tube, in combination with a longitudinally movable regulating slide in said chamber coacting with the opening between the bowl and the tube, and an operating screw for the slide projecting at the back and below the bowl.

MAX SCHLING.